UNITED STATES PATENT OFFICE.

BENJAMIN GEORGE GEORGE, OF LONDON, ENGLAND.

IMPROVEMENT IN PROCESSES OF ORNAMENTING METAL AND OTHER PLATES.

Specification forming part of Letters Patent No. 113,758, dated April 18, 1871; reissue No. 6,980, dated March 7, 1876; application filed July 16, 1875.

*To all whom it may concern:*

Be it known that I, BENJAMIN GEORGE GEORGE, of Hatton Garden, London, England, in the county of Middlesex, lithographer and printer, do hereby declare the nature of my Improvements in Methods of Manufactures and Combinations therewith of Processes for Producing Pictorial, Ornamental, and other Designs to be as follows:

My invention consists of improvements in the manufactures of pictorial, ornamental, and other designs and devices, and for show-tablets for advertising purposes, and for lettering on tin, tinted iron, terne, iron, copper, brass-foil, or other metals, plates, and sheets of metal, or amalgamations thereof, and on the well-known printed tin and terne plates, and on glass, wood, or other suitable materials, both before and after the manufacture of such plates or materials into various articles, the object being a perfection not attainable by the ordinary methods now in use, as well as a large economy in the cost of production.

Pictures, ornamental designs, tablets, and show-cards transferred on metal or other materials, and used as pictures, advertisement-tablets, or in the manufacture of goods of an ornamental and artistic character, to which my improvements relate, have hitherto been prepared in the following manner, viz:

The surface of a sheet of metal or other material is painted over in oil-color, and is then dried in a stove, or otherwise, and, for good work, it is afterward rubbed down with pumice, or otherwise, to obtain a smooth surface, and these processes are repeated one or more times according to the finish and polish required.

The picture, design, or show-tablet, which has been previously printed on what is known as transfer-paper, is then transferred upon this painted surface of the plate or other material, and is afterward varnished and dried. By my improvements I avoid this expensive and imperfect method of producing the painted ground on the surface of the plate previous to the process of transferring the printed work; and I also produce new and attractive gold, silver, and other tinted metallic effects combined with the transferred pictures; and also produce white or other colored imitation grounds on which the pictures have the appearance of lying, but which only register in between and around various portions of the design, though answering the purpose of a ground; and also produce a metallic border or frame-work for the picture or design; and also produce embossed effects for portions of the picture or design; and to these ends I adopt the following means:

I first prepare a design, such as a picture, ornamental design, or show-tablet, and having lithographed it or engraved it, I print it, in the ordinary manner of printing, on transfer-paper, and when the color or colors are well dry, I proceed with one of the first processes of my improvements, as follows:

I pepare a lithograph or suitable metal plate or wood block, or other printed surface, to print one uniform flat surface of color the dimensions required, and upon and all over the picture, or design, or show-tablet—or, in other words, all over and upon the surface of the transfer-paper on which is printed the picture, or design, or show-tablet—I print one or more layers of color, in white, or of whatever tone or tint I desire the ground to be, thereby covering and obliterating the entire printed picture, design, or show-tablet, and making it to appear like one flat sheet of printed color.

I now take a sheet of metal, either tin, iron, copper, brass, or other metal or amalgamation thereof, or it may be glass or wood, or other suitable material, and having rubbed a little oil or varnish over it to make it tacky, I proceed to transfer the printed work in the usual way, and the surface of color last printed upon and over the picture, design, or show-tablet is, by the process of transferring, reversed, and becomes the ground on which the picture, design, or show tablet lies after the transfer-paper is removed; for, by transferring, the order of the printed colors is changed, and this last-printed flat ground coming first on the metal, the picture, design, or show-tablet on the transfer-paper, which was covered by the printed flat ground in the last operation of printing, will appear on the top of it, and the printed ground thereby becomes the substitute for that made by the common and expensive process of first preparing the ground on the metal by the usual means of hand-painting.

Now, for producing the gold, silver, or other tinted metallic effects, I avoid the old methods of bronze-powder or metal-leaf, known as Dutch or planier metal, and have a most simple arrangement to produce a brilliant substitute, to which bronze-powder or metal-leaf is not to be compared. Such effects are now commonly made by dusting bronze-powder on the fresh-printed work on the transfer-paper; or in the case of using metal-leaf by laying it, on the printed work on the transfer-paper and fixing it by pressure, and then transferring it, with the other printed colors forming the picture, design, or show-tablet, upon the painted surface of the metal or other material. Both operations are, however, very expensive.

By my method the whole of the gold and silver and other metallic effects are produced entirely without cost, and are simply the result of my method of making the grounds, as I only lacquer or color the metal or other material the color of gold or silver, or whatever other color may be desired, before transferring the printed picture, design, device, or show-tablet, and I arrange that those parts of the printed picture, device, design, or show-tablet which it is intended to render in silver or gold or other metallic color on the metal, shall be left blank or unprinted upon on the transfer-paper—that is to say, that there shall be no ground color or ink printed on those parts which are wanted to represent gold or silver, and therefore there will be none to transfer; and, such being the case, the metal corresponding to such portions of the design will, after the design is transferred, be seen bare, uncovered, or covered only with the transparent color, and these uncovered parts, fitting in the design, will then take the place of the so-called gold or silver or other colored bronzes or metal leaves, as before explained.

Another of my improved processes is that, when it is desirable to have a frame-work or border to the picture, design, or show-tablet, I prepare the surface of the metal forming such border or frame-work by the before-mentioned method of obtaining gold and silver or other tinted metallic effects. Thus I lacquer or varnish the border or frame-work instead of covering it with opaque oil or other paint, bronze-powder or metal-leaf, as now commonly done. I afterward emboss or stamp up each frame-work or border, if necessary.

I lay particular stress on the transferring and on the printing of the white color, as by its use alone, as a standard or base, is it possible to judge of the true beauty of colors. The use of the white color is therefore a most essential combination and feature in my processes, as, without such standard, the real effect of the commingling and contrasting of associated colors is partly lost, and the appearance of the picture or design is monotonous and lifeless.

Again, to avoid too many layers of color, which is sometimes objectionable, I may print the groundwork only on those parts of the transfer-paper which I afterward require to take the place of the ground in the picture, design, or show-tablet—that is to say, I avoid printing on every or some parts of the already-printed work forming the picture, design, or show-tablet on the transfer-paper, but only between or around them—videlicet, those parts which would answer to the ground and correspond to the uncovered portions of a sheet of paper on which a design might be made—and the whole printed work being then transferred, this last printing, although not lying under the colors forming the picture, design, or show-tablet, would be found to produce the effect of a ground similar to the first-described method, but of advantage for articles which might afterward be subjected to great variations of temperature, as there would be less liability that the color would crack and come off, which is a very important objection to the ordinary system now in use.

I further improve the appearance of the said pictures, designs, and show-tablets by the process of embossing those parts of the work which would be improved by such means, and this part of my improved methods and processes I consider highly important, as by its judicious use I enhance the value of the pictures, designs, or show-tablets to a very high degree. The embossing may be done either before or after transferring the printed work.

When the ground on which the picture, design, or show-tablet is to lie is required to be of a dark tone or color, or black, I then print one or more layers of white color over and upon the various colors forming the printed picture, design, or show-tablet, on the transfer-paper, before printing the dark or black ground, and this white color, coming directly upon the picture, forms a backing, and prevents the colors composing it from being deteriorated by the dark or black ground, which would otherwise come in contact with and upon them, and thereby destroy their purity and brilliancy.

After the transfer of the printed picture, design, or show-tablet to the metal, I may pass it, if desired, through a rolling-machine, such as is used to glaze paper, and this process gives a beautiful, smooth, and polished finish to the transferred work, and prepares it to receive a varnished covering, which may be then applied in the usual way, and it may then be finally stored to harden.

By my process of printing and transferring, the pictures, designs, and show-tablets or letterings thus made are doubly useful, for not only may they be exhibited in the ordinary way, but they may be used as transparencies, as the thin white or tinted ground, although sufficient to back up the design, and so form a ground for the printed design or show-tablet to lie on, according to my system, is nevertheless not thick enough to obscure the light when placed behind, so as to exhibit them as transparencies; and this is very important, for, as transparencies on glass are commonly made, they cannot be seen to advantage when the light is before them, for the want of this white or tinted background or ground to back up the picture or design.

By the above process I am able to produce with great effect and little cost many beautiful works of art for domestic and general use, as well as pictures, illuminated texts, reading-sheets, &c., for use in and for the adornment of schools, &c., the free introduction of which has hitherto been prohibited by their cost.

Having now herein described my invention, and the several methods by which it is performed, I claim—

1. The above-described process of ornamenting metal plates and other material, and of obtaining gold, silver, and other colored metallic effects by lacquering or varnishing the metal or other material, as set forth, and then transferring thereto a printed picture, design, show-tablet, or letterings, the lacquer, &c., serving both as a tacking and also to produce and display the gold or other metallic effects through the open spaces of the design, and through the transparent colors employed, substantially as specified.

2. The above-described process of producing white or other colored imitation grounds, on which the pictures, designs, show-tablets, or letterings have the appearance of lying, but which really are only printed color made to fit or register in between and around various portions of the design, but which are transferred with the design from the transfer-paper to the metal, &c., and answering the purpose of a ground, substantially as and for the purpose set forth.

3. In the process of producing ornamental plates in the manner described and claimed, embossing the portion having the gold, silver, or other metallic effects, substantially as and for the purpose specified.

4. The described process for producing a border or imitation frame to the transferred printed work, such border being the plain metal or other material uncovered, uncoated, and bare, or only covered with transparent color, lacquer, or varnish, instead of the opaque color, bronze, paint, metal-leaf, paint, or gilding heretofore employed.

BENJAMIN GEORGE GEORGE.

Witnesses:

WM. MORGAN BROWN,
GERALD C. HOPPER.